US006632782B1

(12) United States Patent
Mogridge

(10) Patent No.: US 6,632,782 B1
(45) Date of Patent: *Oct. 14, 2003

(54) PAINT REMOVING COMPOSITIONS

(76) Inventor: Ithiel Mogridge, 270 North Road, Yate, South Gloucestershire, BS37 7LQ (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/254,342
(22) PCT Filed: Jul. 6, 1998
(86) PCT No.: PCT/GB98/01987
§ 371 (c)(1),
(2), (4) Date: Jun. 28, 1999
(87) PCT Pub. No.: WO99/01515
PCT Pub. Date: Jan. 14, 1999

(30) Foreign Application Priority Data

Jul. 5, 1997 (GB) .............................. 9714196

(51) Int. Cl.[7] .............................. C11D 1/02; C11D 1/72; C11D 3/26; C11D 3/43
(52) U.S. Cl. ................... 510/174; 510/200; 510/201; 510/240; 510/433; 510/423; 510/499
(58) Field of Search .................. 510/174, 200, 510/201, 240, 423, 433, 499; 134/38

(56) References Cited

U.S. PATENT DOCUMENTS

| 3,551,340 | A | | 12/1970 | Skinner | 252/156 |
| 4,692,263 | A | * | 9/1987 | Eberhardt et al. | 252/122 |
| 5,691,289 | A | * | 11/1997 | Purcell et al. | 510/174 |
| 5,811,383 | A | * | 9/1998 | Klier et al. | 510/417 |
| 6,004,923 | A | * | 12/1999 | Oftring et al. | 510/499 |
| 6,046,149 | A | * | 4/2000 | Sorrie et al. | 510/320 |
| 6,071,867 | A | * | 6/2000 | Purcell et al. | 510/174 |
| 6,106,774 | A | * | 8/2000 | Monticello et al. | 422/28 |
| 6,150,318 | A | * | 11/2000 | Silvester et al. | 510/284 |

FOREIGN PATENT DOCUMENTS

| DE | 4208753 | 9/1996 |
| EP | 0518634 | 12/1992 |
| GB | 2271999 | 5/1994 |

OTHER PUBLICATIONS

McCutcheon's, Emulsifiers & Detergents, vol. 1, p.411 (1995).*

* cited by examiner

*Primary Examiner*—Gregory Delcotto
(74) *Attorney, Agent, or Firm*—Wenderoth, Lind & Ponack, L.L.P.

(57) ABSTRACT

A composition for use in removing paint from painted surfaces comprising an aqueous mixture of at least one alkoxyether solvent, a C1–C6 alcohol, at least one nitrogen containing compound, and a nonionic compound having an HLB value of 7.3 to 15.0.

21 Claims, No Drawings

PAINT REMOVING COMPOSITIONS

This application is a 371 application of PCT/GB98/01987 filed Jul. 6, 1998.

The present invention relates to paint removing compositions. More particularly, it relates to a composition containing one or more alkoxy ether solvents and one or more low molecular weight alcohols with an aqueous blend of surfactants for use in removing paint from a substrate surface.

Paint removing compositions which do not contain chlorinated solvents, especially methylene chloride, are effective within a commercially acceptable timescale, are safe to use and have been sought for some time. Previously, non-methylene chloride systems have been hazardous to use and to store due to the use of highly flammable ingredients. Furthermore, they have been extremely slow to take effect. There are non-methylene chloride paint removers available for sale which require 16 to 24 hours contact time. This is uneconomical for trades people and extremely inconvenient for homeowners engaged in Do It Yourself decorating.

Methylene chloride based paint removers are only effective in the removal of oil-based gloss paints. Removers for water-based paints, such as vinyl silk and emulsion paints are not known.

Methylene chloride is extremely volatile and gives off dangerous vapours which are known to be narcotic and can be fatal, when inhaled in large doses. Therefore, such products must be used only in conditions of good ventilation and in any event, with care. This volatility can lead to a build up of pressure in the container. Care must be taken when opening the container to keep it away from the face, in case of splashes.

Methylene chloride is an exceptionally powerful solvent and, at present, there are no protective gloves which can successfully withstand prolonged contact with products which are based on it. Therefore, gloves have to be frequently washed off or replaced when more than a few minutes use is required.

The paint removing composition of the present invention avoids the above described disadvantages of conventional methylene chloride-based paint removers. In particular, it attacks paint layers so as to produce softened residues that can be easily removed by manual scraping and can be displaced using a water wash, without being corrosive, harmful or irritant to living tissue, without emitting harmful or obnoxious vapours and within a timescale which will be acceptable to any user, whether trade or homeowner. Also, the underlying wood or plaster will not be damaged. Hence the use of this non-chlorinated paint remover will be safer and more convenient than the use of a methylene chloride based paint remover and will be much faster than any of the other non-chlorinated paint removers.

The present invention provides a paint remover composition comprising an aqueous mixture of
(A) at least one alkoxy ether solvent;
(B) an alcohol containing from 1 to 6 carbon atoms;
(C) at least one nitrogen-containing compound selected from
  (i) compounds having the general formula I.

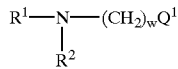 (I)

wherein $R^1$ is H or group of the formula

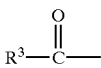

where $R^3$ is a straight or branched chain 6–22 C alkyl or alkenyl group; $R^2$ is H, or methyl or ethyl; w is 1 or 2; and $Q^1$ is —COOM$^1$ or —SO$_3$M$^1$ in which M$^1$ is an alkali metal cation or an optionally substituted ammonium group;

(ii) compounds having the general formula II

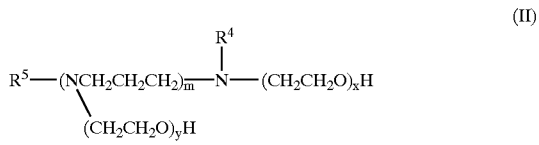 (II)

wherein $R^4$ is H or —(CH$_2$CH$_2$O)$_z$—H; $R^5$ is a straight or branched chain 6–22 C alkyl or alkenyl group; m is 0 or 1; and each of x, y, and z is an integer wherein the total number of (CH$_2$CH$_2$O) groups is in the range of from 2 to 50;

(iii) an imidazoline compound of the formula III

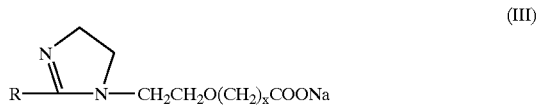 (III)

wherein R is a straight or branched chain 7 to 18 C alkyl group and x is a number from 2 to 10;

(iv) a compound of the formula IV

 (IV)

in which R is a straight or branched chain 7–18 C alkyl group; $R^1$ is —CH$_2$CH$_2$OH or —(CH$_2$)$_x$COONa, where x is 1 or 2, $R^2$ is —(CH$_2$)$_y$COONa, where y is 1 or 2; and $R^3$ is H or —CH$_2$CH$_2$OH; and (v) an alkyl betaine of the formula V

 (V)

wherein R is a straight or branched chain 7 to 18 C alkyl group.

and (D) a compound having the general formula VI

 (VI)

wherein R is a straight or branched chain 6–22 C alkyl or alkenyl) or an alkylphenyl group; Z is O or NH; Q is —(CH$_2$)$_2$— or —(CH$_2$)$_3$— or a combination thereof; n is such that the Hydrophilic Lipophilic Balance (HLB) of the molecule will be 7.3 to 15.0.

It has been found that the incorporation of at least one compound selected from the compounds of formula I to V with a compound of the formula VI in association with one or more alkoxy ether solvents, a low molecular weight alcohol and water improves penetration of the aqueous alkoxy ether solvent through emulsion, vinyl silk and gloss paint, varnishes, and also flecked paint, interior textured paint and oil-based red lead paint into the body of the paint layers leading to fast and thorough removal of these residues. Preferably, a compound having the formula I to V will be incorporated together with a compound having the formula VI. After application of a composition according to this invention, the softened, hydrated paint residues can easily be removed by hand, using a scraper. The residues so produced are water washable unlike residues obtained from prior art paint remover compositions which were only washable using organic solvents. It is also an advantage of the compositions of the present invention that they contain no chlorinated solvents unlike prior art paint remover compositions.

The one or more alkoxy ether solvents will typically be present in the composition of the invention in an amount of up to 95% by weight based on the weight of the composition. The alkoxy ether solvent will usually comprise the main paint removing solvent in the composition. It is possible, however, that part of the alkoxy ether solvent content is replaced by one or more other paint removing solvents. Typical of the alkoxy ether solvents that can be used in the present invention are 1–18 C alkyl (preferably 1 to 6 C alkyl) monoethers of (poly)ethylene glycol, (poly)propylene glycol and (poly)butylene glycol.

For reasons of health and safety, the preferred alkoxy ether solvent will be a propylene glycol ether, especially the dimethyl ether of dipropylene glycol.

The composition of the invention also comprises a straight or branched chain alcohol containing from 1 to 6 carbon atoms. Preferably, the alcohol is a monohydric 1 to 5 C alkanol. An alcohol selected from isopropanol, methanol or ethanol is especially preferred as the alcohol used in association with the alkoxy ether. Ethanol will be more preferred than methanol in view of its reduced toxicity. The alcohol can be used in an amount of up to 95% by weight, based on the weight of the composition.

Softening and hydration of the paint is accomplished by the aqueous alkoxy ether solvent with the low molecular weight alcohol in combination with at least one compound selected from the compounds of formula I to V and a compound of the formula VI. Penetration of the aqueous alkoxy ether through the thickness of the paint layers is a property achieved by the incorporation into the composition of a compound having the formula I with a compound having the formula VI above.

In the composition of the invention, at least one compound selected from the compounds of general formula I, the compounds of general formula II and the compounds of general formula III will be used.

The compounds of the general formula I are as follows:

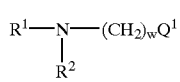
(I)

wherein a $R^1$ is H or a group of the formula

where $R^3$ is a straight or branched chain 6–22 C alkyl or alkenyl group; $R^2$ is H, or methyl or ethyl; w is 1 or 2; and $Q^1$ is —COO$M^1$ or SO$_3M^1$, in which $M^1$ is an alkali metal cation or an optionally substituted ammonium group.

In the general formula I above the group $R^1$ may be H or an aliphatic acyl group of the formula

An example of a compound wherein $R^1$ is H is sodium sarcosine, i.e., the sodium salt of N-methylglycine. Preferably, however, the compound of formula I will be an alkali metal or ammonium salt of the reaction product of a 6 to 22 C alkanoic or alkenoic acid with an amino carboxylic acid or amino sulphonic acid. Examples of such 6 to 22 C acids include the fatty acids lauric acid, myristic acid, palmitic acid, stearic acid and oleic acid. In formula I, $R^2$ is H, methyl or ethyl. $R^2$ preferably, however, is a methyl group. The group $Q^1$ is a carboxylate or sulphonate in salt form where the cation is provided by an alkali metal, such as lithium, sodium or potassium or by an ammonium ion or a substituted ammonium ion, for example monoisopropylammonium ion, monoethanolammonium ion, diethanolammonium ion or a triethanolammonium ion. Preferred examples of compounds having the formula I include sodium N-lauroyisarcosinate, sodium N-oleoylsarcosinate and sodium N-lauroyltaurinate. The compound having the formula I above is typically present in the composition in an amount from 0 to 25% by weight, preferably 0.1 to 15.0% by weight based on the weight of the composition.

The compounds of general formula II are as follows:

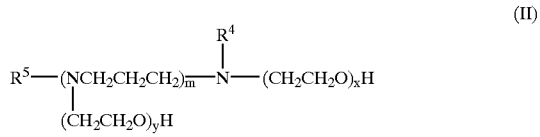
(II)

wherein $R^4$ is H or —(CH$_2$CH$_2$O)$_z$—H; $R^5$ is a straight or branched chain 6–22 C alkyl or alkenyl group; m is 0 or 1; and each of x, y, and z is an integer wherein the total number of (CH$_2$CH$_2$O) groups is in the range of from 2 to 50.

The compounds of the general formula II are ethoxylated amines. Their surfactant behaviour ranges from cationic, where the degree of ethyoxylation is low, to nonionic where the degree of ethoxylation is high. A detailed description of such compounds can be found in "Surfactants UK 1979" by Dr Gordon Hollis, pp 129–131. Preferably, the compounds of the general formula II contain a group $R^5$ which is straight chain 10–18 alkyl or alkenyl group (a fatty alkyl or alkenyl group) and have a value for m of 0 and contain a total number of ethoxy (CH$_2$CH$_2$O) groups in the range from 4 to 10, especially about 5. An example of such a compound is ethoxylated oleylamine. The ethoxylated amine will, in general, be used in the composition of the invention in an amount of not greater than 25% by weight. Examples of such compounds are as follows, wherein $R^5$ is the aliphatic group derived from the indicated fatty amine:

| Fatty amine (Source of $R^5$) | x + y + z number | HLB |
|---|---|---|
| Coconut amine | 2 | 6 |
| Tallow amine | 5 | 14 |
| Stearyl amine | 25 | >17 |

The compounds of the formula III are imidazoline type surfactants.

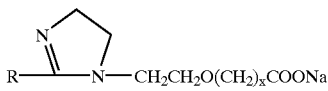

wherein R is a straight or branched chain 7 to 18 C alkyl group and x is 2 to 10. Preferably R is an n-heptyl group and x is 2.

The composition of the present invention may include as the, or one of the, nitrogen-containing surfactant part of the composition a compound of the formula IV

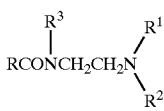
(IV)

in which R is a straight or branched chain 7–18 C alkyl group; $R^1$ is a group selected from —$CH_2CH_2OH$ and —$(CH_2)_x$COONa, where x is 1 or 2, $R^2$ is a group —$(CH_2)_y$COONa, where y is 1 or 2; and $R^3$ is H or —$CH_2CH_2OH$. Preferably the alkyl group R will be a straight chain group to improve the biodegradable properties of the compound. Examples of compounds of the formula IV include sodium cocoamphoacetate (IV, R is coco alkyl (i.e., 12–14 C alkyl), $R^1$ is —$CH_2CH_2OH$, $R^2$ is —$CH_2COONa$ and $R^3$ is —$CH_2CH_2OH$), disodium cocoamphodiacetate (IV, R is coco alkyl, $R^1$ and $R^2$ are both —$CH_2COONa$ and $R^3$ is —$CH_2CH_2OH$), disodium cocoamphodipropionate (IV, R is coco alkyl, $R^1$ and $R^2$ are both —$CH_2CH_2COONa$ and $R^3$ is —$CH_2CH_2OH$) and sodium capryloamphopropionate (IV, R is a capryl group, $R^1$ is —$CH_2CH_2OH$, $R^2$ is —$CH_2CH_2COONa$ and $R^3$ is H). Preferably, the compound of formula IV is sodium capryloamphopropionate.

The nitrogen-containing surfactant used in the composition of the invention may be a betaine of the formula (V)

$$RN^+(CH_3)_2CH_2COO^-$$ (V)

wherein R is a straight or branched chain 7–18 C alkyl group, although a straight chain alkyl group is preferred since these have greater biodegradability than branched chain groups. Preferably the R group is a 12–14 C straight chain alkyl group.

In addition to at least one of the nitrogen-containing compounds above the composition will contain at least one compound of the formula VI $$RZ(QO)_nH$$ (VI)

wherein R is a straight or branched chain 6–22 C alkyl or alkenyl or an alkylphenyl group; Z is O or NH; Q is —$(CH_2)_2$— or —$(CH_2)_3$— or a combination thereof; n is such that the Hydrophilic Lipophilic Balance (HLB) of the molecule will be 7.3 to 15.0. For reasons of biodegradability, the preferred form of Q will be —$(CH_2)_2$—. Compounds of the general formula VI are sometimes described as nonionic surfactants. These are usually represented as, $$R^7Z(CH_2CH_2O)_nH$$

wherein Z is as defined above and $R^7$, the hydrophobe, may be nonylphenyl, a fatty alkyl or alkenyl group and n is the average number of moles of ethylene oxide per mole of $R^7$. By varying the "n" number and the nature of $R^7$ a wide variety of surfactant and physical properties such as the Hydrophilic Lipophilic Balance (HLB) may be obtained. For example:

| Hydrophobe | "n" number | HLB |
|---|---|---|
| Nonylphenol | 4 | 8.9 |
| Nonylphenol | 9 | 12.8 |
| Nonylphenol | 12 | 13.9 |
| Tridecanol | 3 | 8.0 |
| Tridecanol | 5 | 10.5 |
| Tridecanol | 10 | 13.7 |
| Tridecanol | 20 | 16.3 |
| Synthetic C12-13 | 4 | 9.4 |
| Synthetic C12-15 | 3 | 7.8 |

NB For reasons of biodegradability, the preferred form of $R^7$ will be a straight 6-22 C alkyl or alkenyl chain.

Compounds of the general formula VI are alkoxylates. A detailed description of such compounds can be found in "Surfactants UK 1979" by Dr Gordon Hollis, pp 100–135 and p 245. R may be a straight or branched chain of 6–22 C alkyl or 6–22 C alkenyl or an alkylphenyl group wherein the alkyl group is a straight or branched chain 6–22 C alkyl. An example wherein R is an alkylphenyl group is:

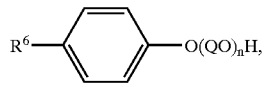

wherein $R^6$ is a straight or branched chain 6–22 C alkyl group and Q is —$(CH_2)_2$— or —$(CH_2)_3$—. An example wherein R is derived from a 12–15 C synthetic alcohol and the HLB of the molecule is 7.8 is $$R(OCH_2CH_2)_3OH$$

Preferably, for reasons of biodegradability, the compounds of the general formula VI contain a group R which is a straight chain 10–20 C alkyl or alkenyl group (a fatty alkyl or alkenyl group) and have a value for n in the range of 3 to 15, especially about 7. An example of such a compound is ethoxylated cetyl/oleyl alcohol (16–18 C). The ethoxylated alcohol will, in general, be used in the composition of the invention in an amount not greater than 25% by weight.

We have found that the use of a compound selected from compounds of formula I to V together with a compound of the formula VI in association with this aqueous alkoxy ether/alcohol system improves penetration of paint residues leading to easier, faster and more effective removal than has hitherto been available from non-chlorinated systems. Furthermore, the paint removing composition of the invention, after application to a painted substrate, gives rise to water-displaceable residues making it possible to clean the treated surface by washing with water after the greatest bulk of softened paint has been removed by a scraper. The water-displaceability of the treated paint residues remaining after using the composition of the invention on a painted substrate is a property achieved by the incorporation into the composition of a compound having the formula I with a compound of formula VI above which has surface active properties.

The compositions of the present invention are aqueous mixtures. Typically, the water content of these compositions will be in the range of from 3 to 80% by weight based on the weight of the composition. Other substances may also be incorporated into the paint removing composition of the invention. The paint removing composition may further contain one or more of waxes, corrosion inhibitors, thickeners, preservatives, colourants, fragrances, additional solvents and additional surfactants. The incorporation of a wax, e.g., paraffin wax or vegetable wax, has the effect of retarding evaporation from a layer of paint remover by forming a very fine skin over the applied layer.

Typically, such a wax will be solid at ambient temperatures, i.e., will have a melting point of at least about 25° C., and will be incorporated into the composition at a concentration of from 0.2 to 3.5% by weight based on the weight of the composition. One or more thickeners may also be used in the composition to improve its viscosity in order to facilitate the application of the composition to a painted substrate surface and to cause it to remain on a surface (e.g., vertical or overhead) to which it is applied. Such thickeners and the concentrations used, are known in the art. Other substances may also be incorporated into the paint remover composition of the invention. For instance, the action of the thickener may be improved by incorporating into the composition compounds having the general formula VII $$R^8-COOH \qquad (VII)$$

wherein $R^8$ is a straight or branched chain 6–22 C alkyl or alkenyl group; and/or a lithium, zinc, calcium, magnesium, aluminium, potassium, sodium, monoethanolammonium, diethanolammonium or triethanolammonium salt thereof. Typically, compounds of the general formula VII above will be incorporated into the composition at a concentration of from 0 to 7%, preferably 0.3 to 3% by weight based on the weight of the composition.

Furthermore, if it is intended to store or market the paint remover compositions of the invention in metal containers, the incorporation of one or more corrosion inhibitors in the composition may be preferred. Such inhibitors, which are known in the art, include as examples sodium metaborate and sodium nitrite.

Additionally, if it is intended to store or display or market the paint remover compositions of the invention over a prolonged period, the incorporation of one or more preservatives in the composition may be preferred. Such preservatives, which are known in the art, include as examples alkyl dimethyl benzyl ammonium hydrochloride, polyhexamethylene biguanide hydrochloride, chloromethylisothiazolinone and methylisothiazolinone.

The paint remover composition of the present invention can be used to remove oil-based paints, water-based emulsion paints, flecked paint, interior textured paint and oil-based red lead paint from surfaces to which they have been applied, such as wood, metal or plaster surfaces.

A preferred paint remover composition according to the invention may be prepared by the following procedure.

Firstly, water is added to a mixing vessel and the temperature of the water is maintained at a value in the range of from 15° C. to 30° C. While stirring, the alkoxy ether is added slowly. The surfactant compound of formula I is added slowly and allowed to disperse into the contents of the vessel. Maintaining stirring, the surfactant compound of formula VI is added slowly and allowed to disperse into the contents of the vessel. In the event that a thickened paint remover composition is required, a thickener (e.g., a modified cellulose type thickener) is preferably added to the contents of the vessel under constant stirring before the addition of the alcohol.

EXAMPLES

Example 1

A paint remover composition according to the invention has the following formulation.

| Ingredient | % by weight based on the weight of the composition |
|---|---|
| De-ionised water | 33.15 |
| dipropylene glycol dimethyl ether | 36.35 |
| sodium N-lauroyl sarcosinate | 4.6 |
| triethanolamine | 2.3 |
| ethoxylated tridecanol having 7 moles ethylene oxide | 9.0 |
| Bermocoll PR (thickener) | 1.0 |
| Methanol | 13.6 |
| Total | 100.0 |

Performance Test 1

The paint remover composition having the formulation set out in Example 1 was tested on a substrate painted with four coats of vinyl silk type paint. "JOHNSTONES" (Registered trade mark), a good quality, branded vinyl silk paint was used. The paint was sufficiently softened to be readily removed by scraping after a dwell time of twenty minutes. Trace residues of paint were easily removed by wiping with a wet cloth.

Performance Test 2

A sample substrate bearing several layers of old gloss paint was treated with the paint remover composition according to Example 1 above. The treated area was test scraped at 5 minute intervals. After twenty minutes the three top coats were sufficiently softened to be readily removed by scraping. A second application and a further dwell time allowed the removal of the under coat and primer.

Performance Test 3

The paint remover composition having the formulation set out in Example 1 was tested on substrate painted with a generous coating of interior textured paint. "POLYTEX" (Registered trade name), a good quality, branded interior textured paint was used.

The treated area was test scraped at 5 minute intervals. After 45 minutes the whole depth of the paint was sufficiently softened to be readily removed by scraping.

Performance Test 4

The paint remover composition having the formulation set out in Example 1 was tested on substrate painted with flecked paint protected with glaze. This finish is much used by local authorities. "LEYFLEK" (Registered trade name), a good quality, branded paint was used.

The treated area was test scraped at 5 minute intervals. After 20 minutes the whole depth of the paint was sufficiently softened to be readily removed by scraping.

Paint Removing Performance (1)

A sample of the composition according the Example 1 above and samples of prior art non-methylene chloride based paint removers were tested according to the following procedure. These prior art paint removing compositions are thought not to contain chlorinated solvent although their actual compositions are not known.

A 60 year old piece of carved wood bearing 14 layers of paint was used. The oldest layers of paint were 60 years old. The 4 or 6 oldest layers of undercoat and gloss would almost certainly have had a high linseed oil content. This was followed by two layers of the dark brown varnish which was popular in this country in the 1940's/early 50's. This was overlaid with 6 to 8 layers of gloss and undercoat paint.

The results obtained were as follows:

| Product | Was product able to achieve complete paint removal? | How many applications were required to achieve this? | What was the total contact time required | Was the product readily water rinsable? |
|---|---|---|---|---|
| Composition of Example 1 | Yes | 2 | 3 hours | Yes |
| Nitromors Super Strip | Yes | 1 | 24 hours | Yes |
| 3M Paint & Varnish Remover | No | >1 | >24 hours | Yes |

Paint Removing Performance (2)

A sample of the composition according to Example 1 and a sample of a readily available non-methylene chloride based paint removing composition were tested according to the following procedure.

An 11 year old piece of wooden window frame bearing 4 layers of paint was used. All layers of paint were 11 years old.

The results obtained were as follows:

| Product | Was product able to achieve complete paint removal? | How many applications were required to achieve this? | What was the total contact time required | Was the product readily water rinsable? |
|---|---|---|---|---|
| Composition of Example 1 | Yes | 1 | 2 hours | Yes |
| 3M Paint & Varnish Remover | No | >1 | >2 hours | Yes |

NB This paint did not blister, wrinkle; erupt or display any visible effects which would indicate that paint softening was taking place.

Paint Removing Performance (3)

The samples of paint removing compositions tested in Performances 1 and 2 above were further tested as follows.

The method of use was the single application, prolonged contact recommended by the competitive products instructions for use.

A 60 year old piece of carved wood bearing 14 layers of paint was used. The oldest layers of paint were 60 years old. The 4 or 6 oldest layers of undercoat and gloss would almost certainly have had a high linseed oil content. This was followed by two layers of the dark brown varnish which was popular in this country in the 1940's/early 50's. This was overlaid with 6 to 8 layers of gloss and undercoat paint.

The results obtained were as follows:

| Product | Was product able to achieve complete paint removal? | How many applications were required to achieve this? | What was the total contact time allowed | Was the product readily water rinsable? |
|---|---|---|---|---|
| Composition of Example 1 | Yes | 1 | 24 hours | Yes |
| Nitromors Super Strip | Yes | 1 | 24 hours | Yes |
| 3M Paint & Varnish Remover | No | 1 | 24 hours | Yes |

What is claimed is:

1. A paint remover composition in the form of a continuous solution comprising an aqueous mixture of (A) at least one alkoxy ether solvent for use in softening a plurality of paint layers;

(B) an alcohol containing from 1 to 6 carbon atoms which assists the alkoxy ether in softening the plurality of paint layers;

(C) (i) a nitrogen containing compound having the general formula I

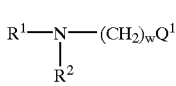
(I)

where $R^1$ is H or group of the formula

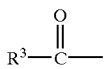

where $R^3$ is a straight or branched chain 6–22 C alkyl or alkenyl group; $R^2$ is H, or methyl or ethyl; w is 1 or 2; and $Q^1$ is $-COOM^1$ or $-SO_3M^1$, in which $M^1$ is an alkali metal cation or an optionally substituted ammonium group, and wherein the compound of formula I, in use, promotes the penetration of the alkoxy ether solvent and the alcohol through the plurality of paint layers by means of its surfactant properties;

and optionally, at least one nitrogen-containing compound selected from (ii) compounds having the general formula II

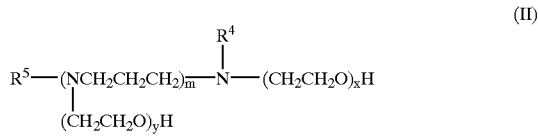
(II)

wherein $R^4$ is H or $-CH_2CH_2O)_z-H$; $R^5$ is a straight or branched chain 6–22 C alkyl or alkenyl group; m is 0 or 1; and each of x, y, and z is an integer wherein the total number of $(CH_2CH_2O)$ groups is in the range of from 2 to 50;

(iii) an imidazoline compound of the formula III

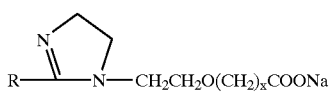 (III)

wherein R is a straight or branched chain 7 to 18 C alkyl group and x is a number from 2 to 10;

(iv) a compound of the formula IV

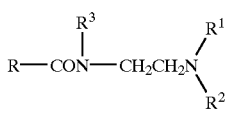 (IV)

which R is a straight or branched chain 7–18 C alkyl group; $R^1$ is —$CH_2CH_2OH$ or —$(CH_2)_x$COONa, where x is 1 or 2, $R^2$ is —$(CH_2)_y$COONa, where y is 1 or 2; and $R^3$ is H or —$CH_2CH_2OH$; and (v) an alkyl betaine of the formula V

R—$N^+(CH_3)_2CH_2COO^-$ (V)

wherein R is a straight or branched chain 7 to 18 C alkyl group; and (D) a compound having the general formula VI $RZ(QO)_nH$ (VI)

wherein R is a straight or branched chain 6–22 C alkyl or alkenyl or an alkylphenyl group;

Z is O or NH; Q is —$(CH_2)_2$— or —$(CH_2)_3$— or a combination thereof; n is such that the Hydrophilic Lipophilic Balance (HLB) of the molecule will be 7.3 to 15.0, wherein the compound of formula VI assists in promoting the penetration of the alkoxy ether solvent and the alcohol through the plurality of paint layers, thereby softening the multiple coats of paint and allowing their easy removal.

2. A composition according to claim 1, wherein the compound having general formula I is an alkali metal salt or an optionally-substituted ammonium salt of the reaction product of a fatty acid selected from lauric acid, myristic acid, palmitic acid, stearic acid and oleic acid with an amino acid selected from glycine, N-methyl glycine and 2-aminoethane sulphonic acid.

3. A composition according to claim 2, wherein the compound of the general formula I is an alkali metal salt or an optionally substituted ammonium salt of N-lauroyl sarcosinate or N-lauroyltaurinate.

4. A composition according to claim 1, containing a compound of the general formula II in which $R^5$ is a straight or branched chain 10–22 C alkyl or alkenyl group, m is O, and wherein the total number of ($CH_2CH_2O$) groups is in the range of from 4 to 10.

5. A composition according to claim 4, wherein the compound having the formula II is an ethoxylated oleylamine.

6. A composition according to claim 1, containing a compound of the general formula VI in which R is a straight or branched chain 6–22 C alkyl or alkenyl group, Q is —$CH_2CH_2$—, and wherein the total number of ($CH_2CH_2O$) groups is in the range of from 3 to 15.

7. A composition according to claim 1, containing a compound of the general formula VI in which R is a straight chain 6–22 C alkyl or alkenyl group, Q is —$CH_2CH_2$—, wherein the total number of ($CH_2CH_2O$) groups is in the range of from 3 to 15.

8. A composition according to claim 7, wherein the compound of the general formula VI is present at a concentration in the range of from 0.1 to 20.0% by weight based on the weight of the composition.

9. A composition according to claim 1, wherein the concentration of the compound of the general formula I is in the range of from 0.1 to 20.0% by weight based on the weight of the composition.

10. A composition according to claim 1, wherein the alcohol is methanol or ethanol.

11. A composition according to claim 1, which additionally contains a compound of the general formula VII $R^8$—COOH (VII)

wherein $R^8$ is a straight or branched chain 6–22 C alkyl or alkenyl group; and/or a lithium, zinc, calcium, magnesium, aluminium, potassium, sodium, monoethanolammonium, diethanolammonium or triethanolammonium salt thereof.

12. A composition according to claim 11, wherein a compound having the formula VII is the sodium salt of a 14–18 C fatty acid.

13. A composition according to claim 1, wherein the compound having the formula VII is present in the composition at a concentration of not greater than 3% by weight based on the weight of the composition.

14. A composition according to claim 1, which additionally contains triethanolamine.

15. A composition according to claim 5, wherein the compound of the general formula II is present at a concentration in the range of from 0.1 to 20.0% by weight based on the weight of the composition.

16. A composition according to claim 1, wherein the alkoxy ether solvent is present at a concentration of up to 95% by weight based on the weight of the composition.

17. A composition according to claim 1 wherein the alcohol is present at a concentration of up to 95% by weight based on the weight of the composition.

18. A composition according to claim 1, which additionally contains one or more members selected from the group consisting of wax and/or other evaporation retardant, fragrance agent, corrosion inhibitors, preservatives, colouring agents and thickening agents.

19. A method of removing paint from a painted surface which comprises applying to the painted surface a composition according to claim 1.

20. A method for removing a plurality of paint layers by softening and hydration of the paint, which comprises applying to the paint layers a paint remover composition in the form of a continuous solution comprising an aqueous mixture of (A) at least one alkoxy ether solvent;
(B) an alcohol containing from 1 to 6 carbon atoms;
(C) (i) a nitrogen containing compound having the general formula I

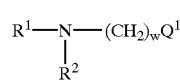 (I)

wherein $R^1$ is H or group of the formula

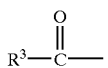

where $R^3$ is a straight or branched chain 6–22 C alkyl or alkenyl group; $R^2$ is H, or methyl or ethyl; w is 1 or 2; and $Q^1$ is —COOM$^1$ or —SO$_3$M$^1$, in which M$^1$ is an alkali metal cation or an optionally substituted ammonium group;

and, optionally, at least one nitrogen-containing compound selected from (ii) compounds having the general formula II

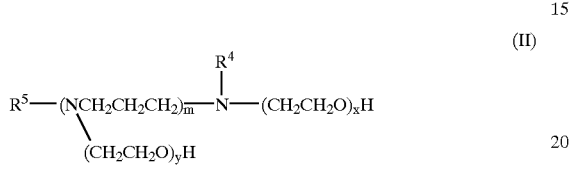

(II)

wherein $R^4$ is H or —(CH$_2$CH$_2$O)$_z$—H; $R^5$ is a straight or branched chain 6–22 C alkyl or alkenyl group; m is 0 or 1; and each of x, y, and z is an integer wherein the total number of (CH$_2$CH$_2$O) groups is in the range of from 2 to 50;

(iii) an imidazoline compound of the formula III

(III)

wherein R is a straight or branched chain 7 to 18 C alkyl group and x is a number from 2 to 10;

(iv) a compound of the formula IV

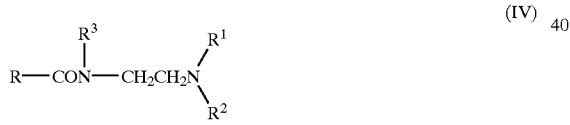

(IV)

in which R is a straight or branched chain 7–18 C alkyl group; $R^1$ is —CH$_2$CH$_2$OH or —(CH$_2$)$_x$COONa, where x is 1 or 2, $R^2$ is —(CH$_2$)$_y$COONa, where y is 1 or 2; and $R^3$ is H or —CH$_2$CH$_2$OH; and (v) an alkyl betaine of the formula V

R—N$^+$(CH$_3$)$_2$CH$_2$COO$^-$ (V)

wherein R is a straight or branched chain 7 to 18 C alkyl group; and (D) a compound having the general formula VI

RZ(QO)$_n$H (VI)

wherein R is a straight or branched chain 6–22 C alkyl or alkenyl or an alkylphenyl group;

Z is O or NH; Q is —(CH$_2$)$_2$— or —(CH$_2$)$_3$— or a combination thereof; n is such that the Hydrophilic Lipophilic Balance (HLB) of the molecule will be 7.3 to 15.0, wherein the alkoxy ether solvent penetrates through the thickness of the paint layers.

21. A paint remover composition in the form of a continuous solution comprising an aqueous mixture of (A) at least one alkoxy ether solvent for use in softening a plurality of paint layers;

(B) an alcohol containing from 1 to 6 carbon atoms which assists the alkoxy ether in softening the plurality of paint layers;

(C) (i) a nitrogen containing compound having the general formula I

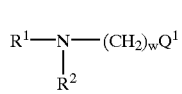

(I)

wherein $R^1$ is H or group of the formula

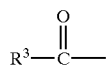

where $R^3$ is a straight or branched chain 6–22 C alkyl or alkenyl group; $R^2$ is H, or methyl or ethyl; w is 1 or 2; and $Q^1$ is —COOM$^1$ or —SO$_3$M$^1$, in which M$^1$ is an alkali metal cation or an optionally substituted ammonium group, and wherein the compound of formula I, in use, promotes the penetration of the alkoxy ether solvent and the alcohol through the plurality of paint layers by means of its surfactant properties;

and, optionally, at least one nitrogen-containing compound selected from (ii) compounds having the general formula II

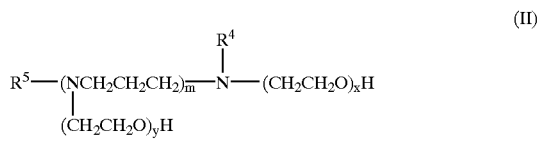

(II)

wherein $R^4$ is H or —CH$_2$CH$_2$O)$_z$—H; $R^5$ is a straight or branched chain 6–22 C alkyl or alkenyl group; m is 0 or 1; and each of x, y, and z is an integer wherein the total number of (CH$_2$CH$_2$O) groups is in the range of from 2 to 50;

(iii) an imidazoline compound of the formula III

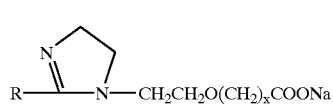

(III)

wherein R is a straight or branched chain 7 to 18 C alkyl group and x is a number from 2 to 10;

(iv) a compound of the formula IV

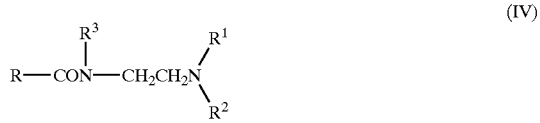

(IV)

in which R is a straight or branched chain 7–18 C alkyl group; $R^1$ is —CH$_2$CH$_2$OH or —(CH$_2$)$_x$COONa, where x is 1 or 2, $R^2$ is —(CH$_2$)$_y$COONa, where y is 1 or 2; and $R^3$ is H or —CH$_2$CH$_2$OH; and (v) an alkyl betaine of the formula V

$$R\text{—}N^+(CH_3)_2CH_2COO^- \qquad (V)$$

wherein R is a straight or branched chain 7 to 18 C alkyl group;

(D) a compound having the general formula VI

$$RZ(QO)_nH \qquad (VI)$$

wherein R is a straight or branched chain 6–22 C alkyl or alkenyl or an alkylphenyl group;
Z is O or NH; Q is —$(CH_2)_2$— or —$(CH_2)_3$— or a combination thereof; n is such that the Hydrophilic Lipophilic Balance (HLB) of the molecule will be 7.3 to 15.0, wherein the compound of formula VI assists in promoting the penetration of the alkoxy ether solvent and the alcohol through the plurality of paint layers, thereby softening the multiple coats of paint and allowing their easy removal; and (E) at least one thickener to increase the viscosity of the composition, whereby application of the composition to a surface is facilitated and whereby the length of time that the composition stays on a surface to which it is applied is increased.

* * * * *